United States Patent [19]
McDowell et al.

[11] Patent Number: 4,960,266
[45] Date of Patent: Oct. 2, 1990

[54] AERIAL CABLE INSTALLATION METHOD

[75] Inventors: Harvey R. McDowell; Douglas J. Blew, both of Hickory, N.C.

[73] Assignee: Siecor Corporation, Hickory, N.C.

[21] Appl. No.: 448,246

[22] Filed: Dec. 11, 1989

[51] Int. Cl.$^5$ ............................................. B65H 59.00
[52] U.S. Cl. .......................................... 254/134.3 PA
[58] Field of Search ............ 254/134.3 PA, 134.3 CL, 254/134.3 FT, 134.3 R, 389–390, 393; 242/7.02

[56] References Cited
U.S. PATENT DOCUMENTS
2,498,834 2/1950 Bennett et al. ................ 254/134.3 R
FOREIGN PATENT DOCUMENTS
58-82208 5/1983 Japan .

Primary Examiner—Robert C. Watson
Attorney, Agent, or Firm—J. David Abernethy

[57] ABSTRACT

Improved sheaves to be placed on utility or telephone poles or towers to facilitate aerial installation of messenger cable systems, such systems comprising a strength messenger having a communication cable helically wrapped around the messenger.

10 Claims, 3 Drawing Sheets

AERIAL CABLE INSTALLATION METHOD

BACKGROUND OF THE INVENTION

U.S. Pat. No. 4,832,442, dated May 23, 1989, issued to Vincent J. Pappas, incorporated herein by reference, discloses a long distance transmission fiber optic cable system having a strength messenger with a fiber optic cable helically wrapped around said messenger. Messenger and communication cable are then placed on a reel. The reel is placed on a truck and then the truck moves to the installation site. Pappas then states that the cable system is simply unwound and suspended in catenary curves between spaced, elevated outdoor supports.

In practice, such installations, as well as other aerial cable installations, are accomplished by mounting sheaves on the poles or towers. A pulling rope, such as a nylon rope, is fastened to the strength messenger cable and then placed over the sheaves on the towers in sequence until the desired pulling point is reached. The pulling rope is then pulled at the pulling point, unwinding the cable system from the reel and drawing the cable system from sheave to sheave until the destination is reached.

It is further customary for the pulling rope to be attached to the cable being pulled by means of a swiveled pulling grip. It is generally undesirable to impart rotational torque on any cable, and the swivel at the point of attachment between the pulling rope and the cable allows such torque to be dissipated at that point. Such swivels are generally adequate to solve the problems of torque when installing a single cable by this method.

Applicants have found that the use of such a swivel at the pulling end is not sufficient to address the problem of torque in the installation of a dual cable system such as described by Pappas. Although torque can be dissipated at the pulling end where the swivel is located, this has been found insufficient to address the problem of torque between the towers or poles. This is especially worrisome in the installation of helically wrapped dual cable systems because both cables tend to rest against the sheave while under tension in the pulling process. As the dual cables are being pulled, a worm gear like action results, imparting torque to the cable system both in front of and behind the sheave. Although such torque at the front end is dissipated at the swivel, the swivel can do little or nothing to relieve the torque building up between the sheave and the preceding sheave or the unwinding reel. The building up of unrelieved torque in turn can cause difficulties in pulling the system and could even damage the transmission cable. Such a transmission cable is not usually designed to be especially rugged since it depends on the messenger for strength purposes.

Applicants believe that the use of a smaller sheave will not be sufficient to fully address the problem, because both cables might rest against the sheave perimeters which define the rim. The use of very narrow sheaves would also tend to lead to increases in frictional drag during the pull

SUMMARY OF THE INVENTION

To improve the method of installing a communications cable helically wound around a strength cable by unwinding them from a spool and pulling them over a plurality of sheaves mounted on spaced outdoor supports, applicants have used improved sheaves which rotate the cable system as it passes over the sheave. Since the cables naturally tend to lie flat on the sheave horizontally under tension, the modified sheaves cause the cables to temporarily move into a vertical position to aid in relieving the buildup of twist. The cables are moved into a vertical position by reducing at intervals on the sheave the space available for the cables to pass. The space available should be no less than D, where D is the outer diameter of the cable having the larger outer diameter, and less than D+d, where d is the outer diameter of the cable having the smaller outer diameter. This means that if the cables have the same outer diameter, D=d.

BRIEF DESCRIPTION OF THE DRAWINGS

The description will refer to the following drawings, in which.

DETAILED DESCRIPTION OF THE PREFERRED EMBODIMENT

Figure 1:
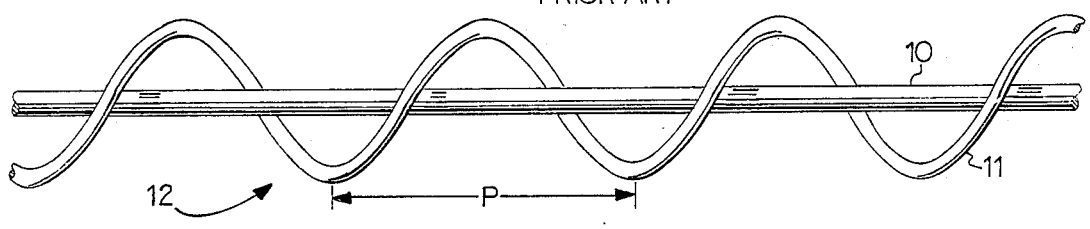
FIG. 1 is a plan view of a prior art cable system having a transmission cable helically wound around a strength messenger cable.

FIG. 1 illustrates a prior art cable system 12 comprising a fiber optic transmission cable 11 helically wound around strength messenger cable 10. The lay length of the transmission cable, illustrated as P in FIG. 1, is the distance between adjacent corresponding points on the transmission cable as it is helically wrapped onto the strength cable.

Figure 2:
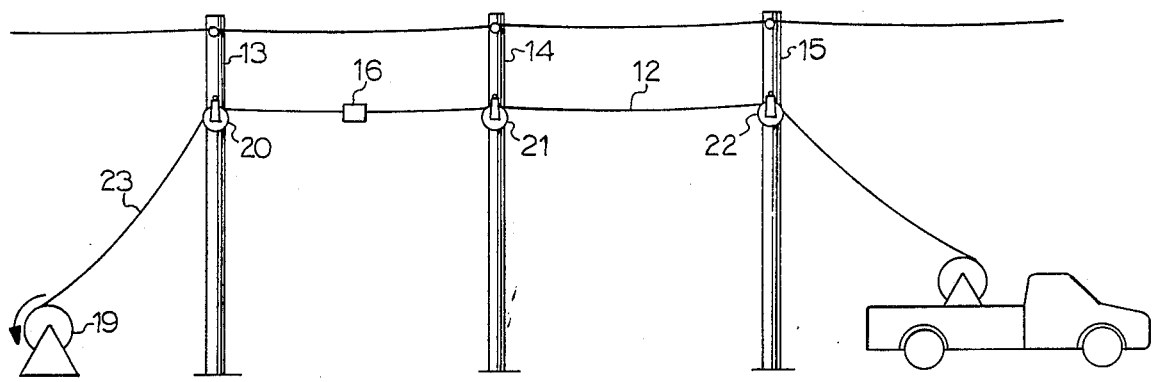
FIG. 2 illustrates the prior art method of installation of the cable system of FIG. 1.

FIG. 2 is a simplified representation of the prior art method of installing cable system 12 on outdoor aerial supports such as telephone poles or transmission towers. Sheaves 20, 21 and 22 are installed on poles 13, 14, and 15, respectively. Nylon pulling rope 23 from reel 19 is threaded over sheaves 20, 21, and 22 and attached to cable system 12 by means of swiveled pulling grip 16. A winch is then operated at reel 19, which turns as illustrated by the arrow, reeling in nylon rope 23 and thereby pulling cable system 12 over sheaves 22, 21, and then 20. Cable system 12 is then affixed to poles 13, 14, and 15 according to prior art methods.

Figure 3:
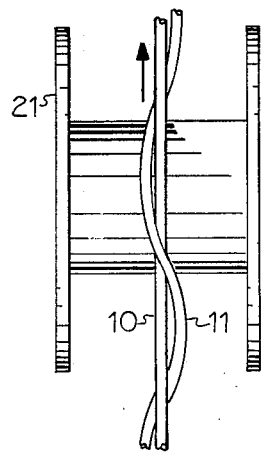
FIG. 3 is an isolated, enlarged plan view of the cable system of FIG. 1 passing over a sheave in FIG. 2.

FIG. 3 is an isolated view of cable system 12 passing over sheave 21 during a pull. Sheave 21 is shown enlarged more than would be customary for purposes of clarity. The problem observed by applicants is that cables 10 and 11 tend to lie side by side along the hub of sheave 21 while cable system 12 is being pulled under tension. Since cables 10 and 11 each tend to remain pressed flat against the drum along side each other as the pull proceeds, undesirable twist builds up in the cable system 12 during the pull. Again referring to FIG. 2, although twist can be relieved at swivel pulling grip 16, twist tends to build up between sheaves 21 and 22 and between sheave 22 and the reel upon which system 12 was brought to the installation site. Of course, twist will also build up between any additional poles which might be between poles 14 and 15 in a longer pull.

Figure 4:
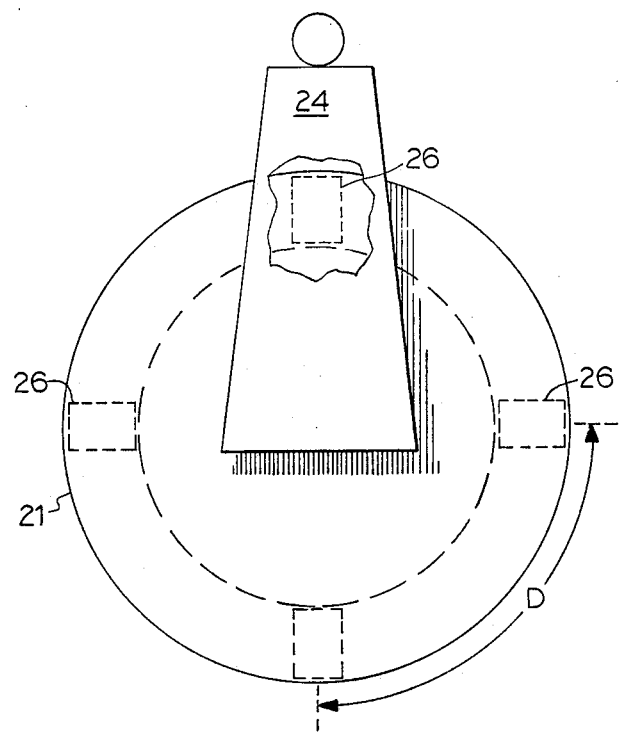
FIG. 4 is a side view of a modified sheave according to the invention showing placement of inserts represented by dash lines.

FIGS. 4 through 9 illustrate apparatus used by applicants to reduce or eliminate the problem of twist above described. FIG. 4 is a side diagrammatic view of sheave 21 as held onto a pole by support 24. Shown as dashed boxes in FIG. 4 are four inserts 26, which are spaced apart from each other along the rim of sheave 21 at a distance D.

Figure 5:
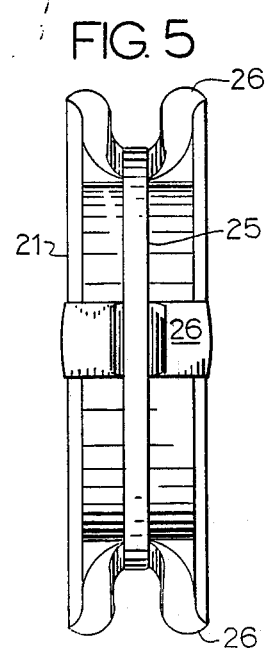
FIG. 5 is a plan view of a modified sheave and inserts according to the invention.
Figure 6:
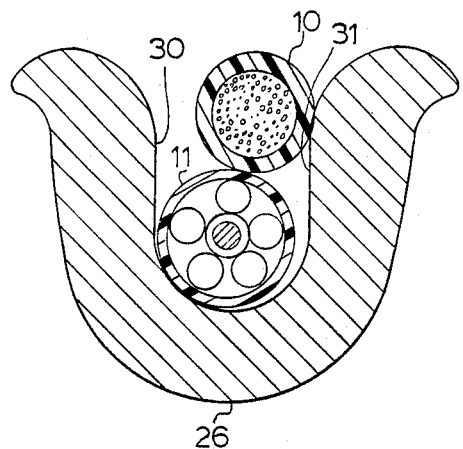
FIG. 6 is an enlarged sectional view of the cable system passing through an insert according to the invention.

FIG. 5 shows the first embodiment of inserts 26 as installed on sheave 21. Inserts 26 are U shaped, and affixed to a normal sheave 21 with steel band 25, which may be mounted in a well known manner; since such steel bands are in common use on packaging and the like. FIG. 6 shows the action caused by inserts 26 in greater detail. U shaped member 26 has legs 30 and 31. Carried within the U shaped insert 26 are transmission cable 11 and strength messenger cable 10. The function of insert 26 is to cause cables 10 and 11 to assume a substantially vertical position as they pass through insert 26, instead of the horizontal position which they otherwise would tend to assume. To accomplish this, the distance between the surfaces 30 and 31 should be at least OD, where OD is the outer diameter of the larger of cables 10 and 11, but should be less than the sum of OD plus d where d is the outer diameter of the two cables having the smaller outer diameter. If the distance were less than OD, the system would not pass through the insert; if it were OD d or larger, both cables could lie flat against the surface of the insert, and the insert would not perform its intended function.

Inserts 26 are spaced apart from each other a distance D along the rim of sheave 21 in order to allow the system to alternate between a vertical and a horizontal position as it would be expected to do in the absence of twist. Placing inserts 26 too closely together would have the effect of simply using a smaller sheave, which it is believed would not solve the problem of twist and would instead simply increase the amount of frictional forces to be overcome during the pull.

Figure 7:
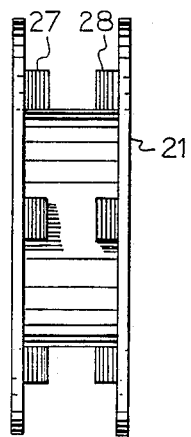
FIG. 7 is a plan view of a sheave according to the first alternate preferred embodiment.

FIG. 7 shows the first alternate preferred embodiment of a sheave according to the improved method. Insert members 27 and 28 are shown affixed to the sides of the sheave rim as shown. The distance between insert members 27 and 28 should be at least OD but less than OD +d as discussed above.

The inserts in FIG. 6 and FIG. 7 should each be spaced apart from each other at a distance D along the sheave rim as illustrated. Distance D is optimized at a distance of approximately one-half of the cable system lay length P as illustrated in FIG. 1.

Figure 8:
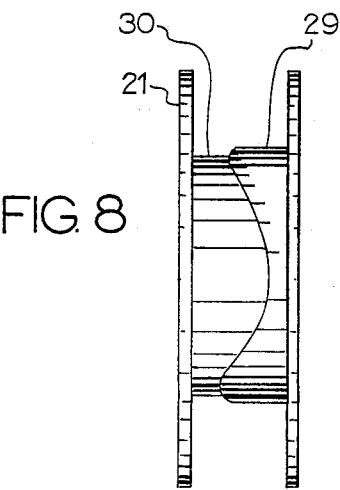
FIG. 8 is a plan view of a sheave according to the second alternate preferred embodiment of the invention.

A second preferred embodiment of a sheave used in the proved method is illustrated in FIG. 8, where the drum has a smaller outer diameter drum portion 30 and a larger outer diameter drum portion 29. Since the cables will tend to ride on drum portion 30, the sinusoidal variation between drum portions 30 and 29 will tend to cause the same action as will be caused by inserts 26, 27 and 28. Applicants believe that the period of the sinusoidal pattern on the drums should be P divided by 2 where P is the cable system lay length as shown in FIG. 1. The drum as shown in FIG. 8 could be formed by molding or carving, depending on the material used for the sheave.

What is claimed is:

1. A method of installing a system for long distance outdoor communication transmissions comprising:
    (a) providing a cable system comprising a strength cable and a communications cable helically wound around the strength cable;
    (b) mounting a sheave to each of a plurality of spaced apart outdoor supports, each sheave having at least three inserts mounted thereto, each insert causing the strength cable and the communication cable to be in a substantially vertical orientation as they pass through the insert; and
    (c) pulling the cable system while the cable system is supported by a plurality of the sheaves.

2. The method of claim 1, wherein at least three inserts are spaced apart along the rim of a sheave a distance of one-half the cable system lay length.

3. The method of claim 1, wherein each insert is a U-shaped body having legs spaced apart a distance not less than OD and less than OD+d, where OD is the outer diameter of the system cable having the larger outer diameter and d is the outer diameter of the other system cable.

4. The method of claim 1, wherein each insert comprises at least one object mounted to the sheave rim which reduces the space available for the sheave system on the rim at the location of the insert to a distance not less than OD and less than OD+d, where OD is the outer diameter of the system cable having the larger outer diameter and d is the outer diameter of the other system cable.

5. A method of installing a system for long distance outdoor communication transmissions comprising:
    (a) providing a cable system comprising a strength cable and a communications cable helically wound around the strength cable;
    (b) mounting a sheave to each of a plurality of spaced apart outdoor supports, each sheave having a drum width which varies in a regular pattern on the drum at a period of one half the cable system lay length; and
    (c) pulling the cable system while the cable system is supported by a plurality of the sheaves.

6. The method of claim 5, wherein the drum width variation is sinusoidal.

7. A method of installing a cable system comprising a communications cable helically wound around a strength cable for long distance outdoor communication transmissions comprising pulling the system over a plurality of sheaves mounted spaced apart on outdoor supports, at least two of said sheaves having at least three inserts mounted thereto causing the strength cable and the communications cable into a substantially vertical position as they pass through an insert.

8. The method of claim 7, wherein each insert comprises at least one object mounted to the sheave rim which reduces the space available for the sheave system on the rim at the location of the insert to a distance not less than OD and less than OD+d, where OD is the outer diameter of the larger outer diameter and d is the outer diameter of the other system cable.

9. The method claim 8, wherein each insert is U-shaped.

10. A method of installing a cable system for outdoor communication transmission, comprising:

(a) providing a communications cable helically wound around a strength cable; and
(b) pulling the system over a plurality of sheaves mounted spaced apart on outdoor supports, at least two of said sheaves having a drum width which is a nonconstant function of the angle contained in a plane peripendicular to the axis of its sheave whose vertex is on the central axis of its sheave and whose end points are a given point on the drum and another point on the drum where the drum width is to be determined.

* * * * *